United States Patent Office 3,081,837
Patented Mar. 19, 1963

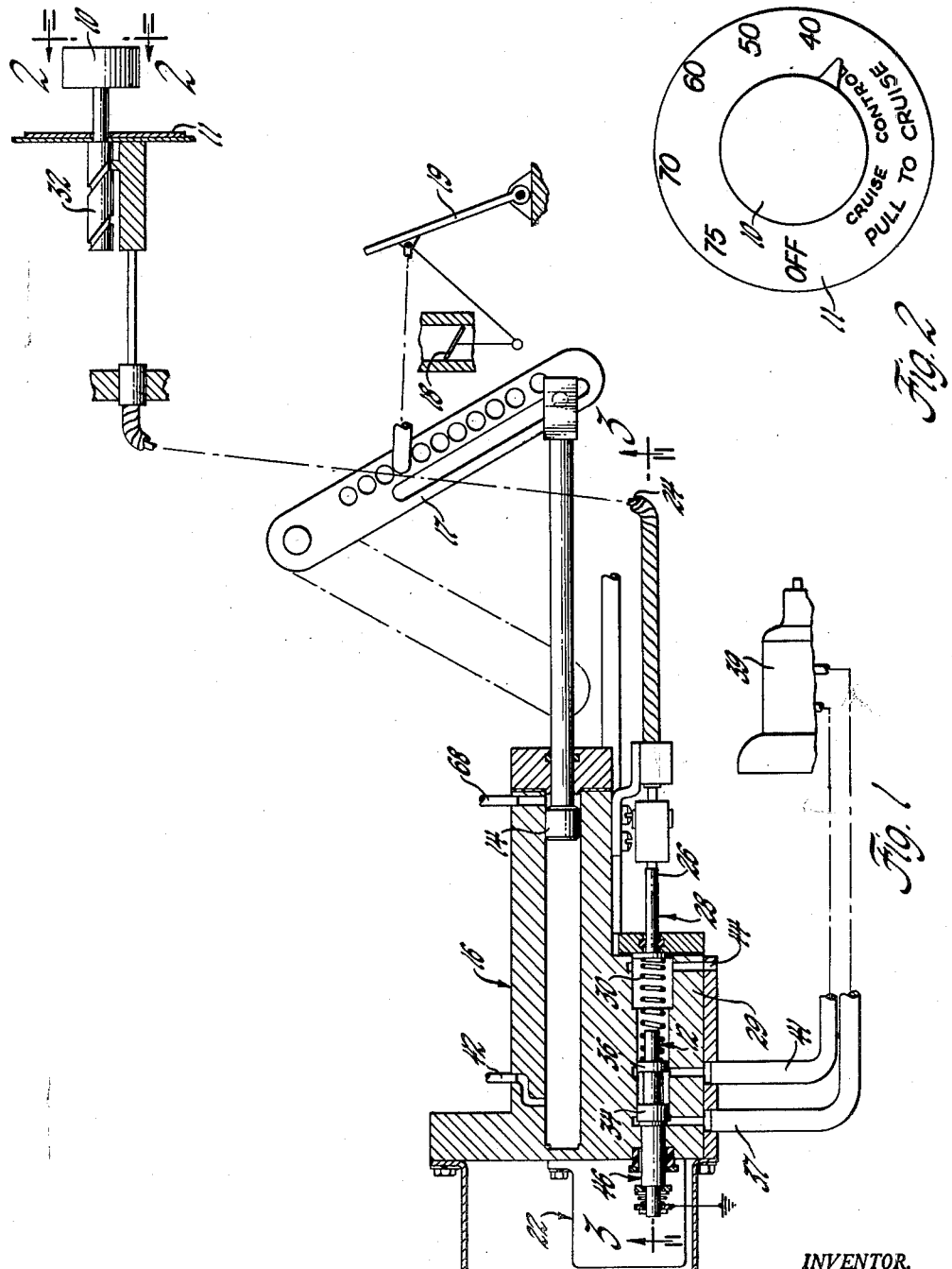

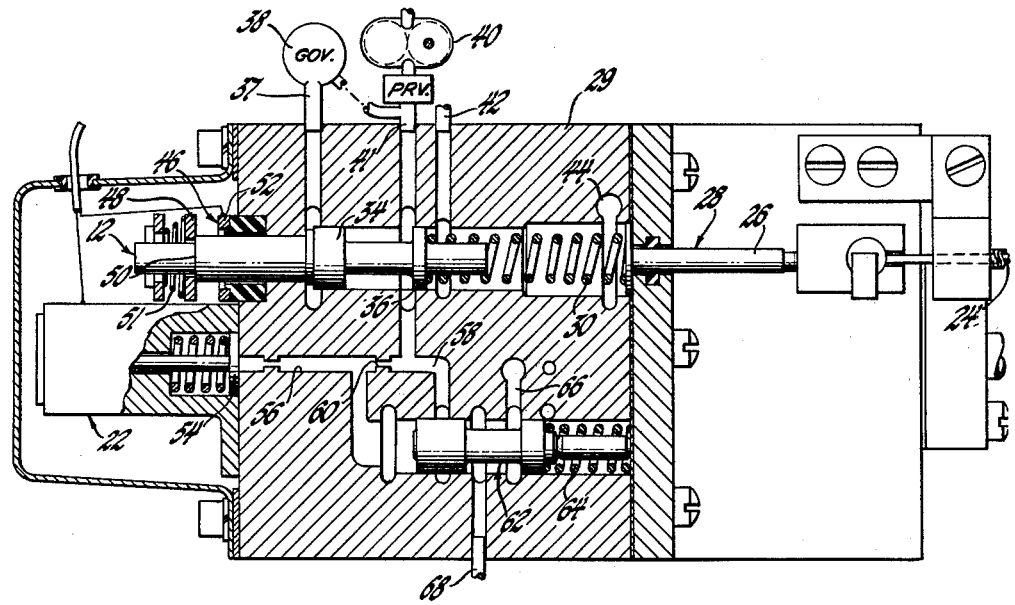

3,081,837
SPEED CONTROL SYSTEMS
Louis M. Fiteny, Allen Park, Mich., assignor to General Motors Corporation, Detroit, Mich., a corporation of Delaware
Filed Nov. 18, 1960, Ser. No. 70,235
13 Claims. (Cl. 180—82.1)

This invention relates generally to speed control systems and more particularly to a system adapted for use, although not exclusively, with those vehicles having fluid pressure operated transmissions.

Because of the increase in the number of so-called superhighways, a demand has arisen for vehicle speed control systems that enable a selected vehicle speed to be maintained without requiring careful attention on behalf of the driver. The systems offered have not been entirely satisfactory either because there is a failure to afford accurate speed control, particularly along those highways where the incline is constantly changing, or the complexity renders the cost prohibitive. These complex systems inherently demand careful and frequent calibration and often the mere operation of the system demands special techniques and driver education, particularly as to the modes of insuring that the system is "fail-safe."

It is, therefore, proposed to provide a speed control system that overcomes the aforementioned problems, one that by its arrangements is very accurate since ordinary errors are compensated for by the system itself, and one that operates automatically and is effective only upon the occurrence of a predetermined condition within the control of the operator.

The invention further contemplates a novel vehicle speed control system particularly suited for combining with a fluid pressure operated transmission. Specifically, the invention seeks to provide a speed control system that utilizes the transmission fluid pressure control system without demanding any revisions therein.

The foregoing and other objects and advantages of the invention will be apparent from the following description and from the accompanying drawings in which:

FIGURE 1 is a schematic showing of a vehicle speed control system incorporating the various features and principles of the invention;

FIGURE 2 is a plan view looking in the direction of arrows 2—2 in FIGURE 1 of a manually operable cruise control knob for the system;

FIGURE 3 is a diagrammatic detailed view of the fluid pressure circuitry for the FIGURE 1 system taken along line 3—3 of FIGURE 1; and FIGURE 4 is a diagrammatic showing of the electrical circuitry for the FIGURE 1 system.

Referring first to FIGURE 1 of the drawings, as mentioned the depicted speed control system employs both fluid and electrical circuitry. As will become more apparent, when the instrument panel mounted speed or cruise control knob 10 is pulled outwardly and rotated to one of the indicated speed settings displayed on a dial 11, e.g., 40–75 m.p.h., the regulating point for a pressure regulating or developing device such as governor valve 12 will be altered.

Thereafter, the governor valve 12 will develop a corresponding signal pressure, which reflects both the selected speed and any variations in the actual vehicle speed relative to this selected speed and which, in the illustrated embodiment of the invention, acts on one side of a piston 14 for a carburetor servo 16 so as to, through a suitable agency as throttle linkage 17, urge an engine speed controller or throttle 18 and a connected accelerator pedal 19 towards a decreasing engine speed or a throttle closed position. At the same time the cruise control knob 10 is pulled outwardly, a lock-in switch 20 (see FIGURE 4) is closed, and this will, if the electrical circuitry is properly conditioned, effect an energization of a control relay 22 and thereby cause a pressure, hereinafter designated as a reference pressure, to act on the side of the piston 14 opposite that exposed to the signal pressure from the governor valve 12. Consequently, the reference pressure will urge the throttle 18 towards an increasing engine speed or a throttle open position in opposition to the signal pressure until a balance is attained at the selected speed.

Considering first the fluid pressure controls viewed in FIGURES 1 and 3, a cable 24 is connected at one end to the cruise control knob 10 and at the other end to a stem portion 26 of the piston 28. Piston 28 is slidable within a bore in a valve body 29 and acts against a spring 30 so as to alter the tension thereof. Longitudinal movement of the cable 24 is developed from rotary movement of the cruise control knob 10 through a suitable screw arrangement displayed generally at 32.

The governor valve 12, which is acted upon by the spring 30, comprises spaced lands 34 and 36 so arranged that the face area established by land 34 is exposed to governor pressure delivered to the adjacent port via a line 37 from a governor 38, which may be the kind disclosed in the U.S. patent Thompson 2,204,872. Preferably, the governor 38 is driven at a speed corresponding to vehicle speed and is the same governor employed by a fluid pressure operated transmission 39, e.g., a transmission of the type known as the hydra-matic transmission. Of course, if engine speed is being controlled, the governor 38 will sense engine speed. Land 36 is adjacent a port that is supplied regulated line pressure from a pump 40 via a line 41. Again, pump 40 is the one employed by the transmission 39. When the governor valve 12 moves to the regulating position in which the forces acting thereon from governor pressure and the spring 30 are balanced, land 36 will either establish or interrupt communication between an outlet line 42 extending to the carburetor servo 16 and an exhaust 44 so that the signal pressure in the outlet line 42 will be proportional to the manually established bias from spring 30 and will also reflect changes in governor pressure since these changes will upset the balance.

When the governor valve 12 reaches the regulating position, a speed control switch denoted generally at 46 in FIGURE 3 is closed. The speed control switch 46 includes a contact ring 48 positioned on the end of the governor valve 12 and biased against a shoulder 50 thereon by a take-up spring 51 and an insulated contact 52 positioned in the valve body 29 and insulated therefrom. In the regulating position of the governor valve 12, the contact ring 48 will engage the insulated contact 52 and complete, as will be explained, a connection to ground. The contact ring 48 is permitted by the take-up spring 51 to move relative to the governor valve 12 so as to not interfere with regulating movements of the valve 12.

The signal pressure supplied to outlet line 42 acts on the left end of carburetor servo piston 14 as viewed in FIGURE 1 and tends to urge the carburetor throttle valve 18 as mentioned towards the closed setting. The reference pressure for opposing this signal pressure is obtained, as has been described, when the control relay 22 is energized. This can best be understood by again referring to FIGURE 3, for when the control relay 22 is energized, a plate valve 54, which performs as the relay armature, is unseated and exhausts a restricted drain passage 56 joined to a branch 58 of the line 41 through a restriction 60. Line pressure, which had acted on the left end of a spool type supply valve 62, slidable within another bore in the valve body 29, is now relieved, and a spring 64 will move the supply valve 62 to the left from the FIGURE 3 position and to the operative position thereof in which communication between an exhaust 66 and an outlet line 68 is interrupted and communication between branch 58 and the outlet line 68 is established. Consequently, the reference pressure corresponds to the regulated line pressure and is supplied to the right end of the carburetor servo piston 14 where it will act on a smaller differential area than the signal pressure acting on the opposite side of the piston 14. The piston 14 will, as a result, assume a position determined by the proportion between the signal pressure and the reference pressure; and, of course, the bias normally returning the accelerator pedal 19 to the throttle closed position. With the structure so far described, the driver must cause the speed of the vehicle to approximate that desired, then pull out the cruise control knob 10, and turn it to the desired setting. If vehicle speed is slightly less than selected, the signal pressure will also be less since it varies directly with governor pressure, and therefore, the reference pressure will prevail so as to cause the throttle setting to be increased. The increasing of the throttle setting will, in turn, cause the governor pressure to be increased to the proper amount. On the other hand, if the vehicle speed is slightly above that chosen, governor pressure will be greater and will act to reduce the throttle setting.

Referring now to FIGURE 4 along with FIGURE 1 for a detailed description of the electrical circuitry, preferably the vehicle battery shown at 72 is employed as a current source and has in series therewith an ignition switch 74, a stop light switch 76, a manual transmission selector lever switch 78, and a speed cut-off switch 80. In parallel with these switches is a lock-in relay 82, which operates normally open contacts 82a, and the lock-in switch 20 previously mentioned. Also, in this circuit is a relay 84, which operates two sets of normally open contacts 84a and 84b, each of which extends to the control relay 22. A lamp 86 is arranged in parallel with the control relay 22 and lights when the control relay 22 is energized so as to furnish the driver with a visual indication that the system is operative.

From this FIGURE 4 circuit diagram, it can be seen that initially all of the switches must be closed before the control relay 22 can be energized. Considering the switches individually the ignition switch 74 would, of course, have to be closed for the vehicle to be operative. The stop light switch 76 is so arranged as to be normally closed except when the vehicle brakes are operated. Then, the stop light switch will open and interrupt the operation of the system by causing the supply valve 62 to be returned to the FIGURE 3 position in which line 68 is connected to exhaust 66. The relief of the reference pressure will permit the signal pressure to dominate and close the throttle 18. The manual selector lever switch 78 in this arrangement is intended to be closed in only certain settings of the manual selector lever 88, e.g., Low and Drive, since generally the system would not be used in Reverse nor would it be wanted in Neutral. The speed cut-off switch 80 is operated by the control knob 10 and opens when the cruise control knob 10 is turned to the Off position.

In describing the operation of the FIGURE 4 circuitry, it will be assumed that switches 74, 76, 78, and 80 are closed. When the cruise control knob 10 is pulled outwardly to start operation of the system, the lock-in switch 20 will be closed whereupon relay 82 will be energized so as to close contacts 82a. This sets up the circuit for relay 84, which will become energized when the speed control switch 46 is closed by the governor valve 12. The energization of relay 84 closes contacts 84a and 84b, and therefore, the control relay 22 is energized as soon as the governor valve 12 assumes the regulating position so that the supply valve 62 is moved to the operative position. When this happens, the fluid circuit becomes effective to operate the carburetor servo 16, and the control system is now operative.

If one of the switches 74, 76, 78 or 80 should be subsequently opened, the relays 82 and 84 will both be deenergized and accordingly the control relay 22. The deenergization of control relay 22 eliminates the reference pressure acting on the carburetor servo piston 14 and hence, any signal pressure existing at this time will close the carburetor throttle 18 in the way previously described.

Summarizing the operation of the control system as a whole, it will again be assumed that the driver has the vehicle proceeding at approximately the speed wanted, for instance 50 m.p.h. To commence automatic operation of the control system, the driver must pull the control knob 10 outwardly and then rotate it until set at the 50 m.p.h. position on the dial 11. This, through the cable 24, and the piston 26, will compress the spring 30 so that the bias force from the spring 30 will correspond to this speed setting. The governor pressure supplied by the transmission governor 38 will furnish an opposing force, which will be either more or less than the governor pressure developed at the 50 m.p.h. speed if vehicle speed is correspondingly more or less than this 50 m.p.h. In the manner earlier described, the governor valve 12 will develop a signal pressure in the line 42 from line pressure delivered thereto via the line 41 from the transmission pump 40. Actually, if the driver prefers, the control knob 10 can be set while the vehicle is proceeding at a speed considerably less than the chosen speed. This is possible because the governor valve 12 will not open the port connected to the line 42 until governor pressure is adequate to move the governor valve 12 to the regulating position.

In continuing with the operational summary, it will now be assumed that the speed control switch 46 is closed due to the governor valve 12 assuming its regulating position. The electrical circuitry will consequently become effective since the control knob 10 will have closed both the lock-in switch 20 and the speed cut-off switch 80. As a result, the control relay 22 is energized and the supply valve 62 caused to be removed from the FIGURE 3 position to that in which communication is established between the line 68 and the pump 40. This reference pressure being regulated line pressure will be substantially constant so as to not induce any fluctuations into the speed control. It is mentioned here that should line pressure for some reason decrease, because it is line pressure that is controlled by the governor valve 12 in order to obtain a signal pressure, the signal pressure will change to the same extent that the reference pressure changes. Hence, there need be no concern for line pressure variations and their influence on the control system operation. If the actual vehicle speed corresponds to the selected 50 m.p.h. setting, the position of the throttle 18 established by the opposing forces from the signal and reference pressure acting on the carburetor servo piston 14, will be that required to produce the selected vehicle speed. If the road load changes so as to alter the vehicle speed, governor pressure will change and likewise the signal pressure so that the throttle 18 will be re-positioned to an extent required to return the vehicle speed to that selected. Also, if for some reason, the driver wishes to change the speed setting, he merely rotates the control knob 10 to the new setting and this will change the bias of the spring 30, either increasing or decreasing the signal pressure a conforming amount whereupon the throttle setting will be revised to this new speed.

There are several ways to interrupt the automatic control, each of which has been briefly mentioned previously. For example, the driver can move the control knob 10 inwardly and open both the lock-in switch 20 and the speed cut-off switch 80. The opening of the speed cut-off switch 80 will cause the control relay 22 to be deenergized in the aforedescribed way and this eliminates the reference pressure. It should be noted that the positioning of the control knob 10 inwardly preferably does not appreciably change the bias of the spring 30 acting on the governor valve 12. Consequently, the signal pressure existing at this time will return the throttle 18 in the absence of opposition from the driver to the closed setting. The applying of the brakes will open stop light switch 76 and also halt operation of the system. The manual selector lever 88 if removed from either of the two settings suggested will open manual selector lever switch 78 and again the system will become inoperative or the ignition switch can be opened and accomplish the same thing.

From the foregoing, it can now be seen that utilization has been made of the transmission control system deriving pump pressure and governor pressure therefrom. Consequently, fewer parts are needed for the control system. Also, adequate provision is made for interrupting the automatic operation, whereas on the other hand, automatic operation is established quite easily by simple movements of the control knob 10. Calibration is of no particular problem since variations in the line pressure are compensated for in the way explained.

Although the speed control system has been described in conjunction with a vehicle transmission, it should be understood that if a transmission of the required type is not available, separate pumps and governors can be employed. Furthermore, the speed control system is not limited to a vehicle but can be used to govern the speed of any throttle controlled engine.

The invention is to be limited only by the following claims:

1. In a speed control system for an engine, the combination of an engine speed controller, fluid pressure actuated means for operating the speed controller, supply means operative to provide a reference pressure for causing the pressure actuated means to urge the speed controller in one direction, and regulating valve means developing a signal pressure reflective both of a selected speed and variations in the engine speed from the selected speed for causing the pressure actuated means to urge the speed controller in the opposite direction, means for causing the signal pressure developing means to render the supply means operative when a certain signal pressure is supplied to the pressure actuated means, the signal and reference pressures causing the pressure actuated means to alter the engine speed controller setting so that engine speed corresponds to the selected speed.

2. In a speed control system for an engine, the combination of an engine speed controller, fluid pressure actuated means for operating the speed controller, a source of pressure, supply means operative to connect the source to the fluid pressure actuated means for urging the speed controller in one direction, a governor driven at a speed corresponding to engine speed so as to develop a corresponding governor pressure, and pressure developing valve means coacting with the governor to produce a signal pressure reflective both of a selected speed and variations in engine speed from the selected speed for causing the pressure actuated means to urge the speed controller in an opposite direction, means for causing the signal pressure developing valve means to render the supply means operative when a governor pressure corresponding to the selected speed is developed, the signal pressure and the pressure from the source causing the pressure actuated means to alter the engine speed controller settings so that engine speed corresponds to the selected speed.

3. In a speed control system for an engine, the combination of an engine speed controller, fluid pressure actuated means for operating the speed controller, a source of pressure, supply means operative to connect the source to the pressure actuated means for urging the speed controller in one direction, regulating valve means developing from the source pressure a signal pressure reflective both of a selected speed and variations in engine speed from the selected speed for causing the pressure actuated means to urge the speed controller in the opposite direction, means for causing the signal pressure developing means to render the supply means operative when an engine speed corresponding to the selected speed is attained so that the pressure actuated means will alter the engine speed controller settings in accordance with the differences between the signal pressure and the pressure from the source thereby causing engine speed to correspond to the selected speed.

4. In a speed control system for an engine, the combination of an engine speed controller, fluid pressure actuated means for operating the speed controller, a source of pressure, supply means operative to connect the source to the pressure actuated means for urging the speed controller in one direction, regulating valve means developing from the source of pressure a signal pressure that varies directly with changes in engine speed from a selected speed, and means operated by the signal pressure developing regulating valve means for rendering the supply means operative when a certain signal pressure is developed so that the signal pressure and the pressure from the source cause the pressure actuated means to alter the engine speed controller settings thereby conforming engine speed to the selected speed.

5. In a speed control system for an engine, the combination of an engine speed controller, fluid pressure actuated means for operating the speed controller, a source of pressure, a governor driven at a speed corresponding to engine speed and so arranged as to develop a governor pressure reflecting variations in engine speed, supply valve means operative to connect the source to the pressure actuated means so as to cause the speed controller to be urged in one direction, pressure regulating valve means operated by governor pressure so as to develop a signal pressure reflective both of selected speed and variations in engine speed from the selected speed, and means operated by the pressure regulating valve means so as to cause the supply valve means to be operative when a governor pressure corresponding to the selected speed is developed, the pressure actuated means altering the engine speed controller settings in accordance with the signal pressure and the pressure from the source so as to cause engine speed to correspond to the selected speed.

6. In a speed controlling system for an engine, the combination of an engine speed controller, fluid pressure actuated means for operating the speed controller, a source of relatively constant pressure, a governor effective to develop a pressure that varies directly with engine speed, a manual control maneuverable for selecting an engine speed, a governor valve controlled both by governor pressure and the manual control and so arranged as to develop from source pressure a signal pressure reflective both of the speed selected by the manual control and variations in the engine speed from the selected speed determined by the governor pressure, the signal pressure being delivered from the governor valve to the pressure actuated means so as to cause the speed controller to be urged in one direction, a supply valve operative to connect the source to the pressure actuated means, the source pressure acting on the pressure actuated means so as to cause the speed controller to be urged in the opposite direction, and means controlled by the governor valve for rendering the supply valve operative when a governor pressure corresponding to the selected speed is developed, the signal pressure and the source pressure together causing the pressure actuated means to alter the speed control settings so that engine speed corresponds to the selected speed.

7. In a speed control system for a throttle controlled vehicle having a transmission that includes a governor, the combination of fluid actuating means for operating the throttle, supply means operative to provide a reference pressure for causing the pressure actuated means to urge the throttle in one direction, and regulating valve means controlled by the governor for developing a signal pressure reflective both of a selected vehicle speed and variations in the actual vehicle speed from the selected speed for causing the pressure actuated means to urge the throttle in an opposite direction, means for causing the signal pressure developing valve means to render the supply means operative when the selected vehicle speed is developed so that the reference pressure is furnished the pressure actuated means, the signal pressure and the reference pressure together causing the pressure actuated means to alter the throttle settings so that vehicle speed corresponds to the selected vehicle speed.

8. In a speed control mechanism for a throttle controlled vehicle having a transmission that includes a pressure source and a device for developing a governor pressure that corresponds to vehicle speed, the combination of fluid actuated means for operating the throttle, supply means operative to connect the source to the pressure actuated means so as to cause the throttle to be urged in one direction, and pressure developing valve means operated by governor pressure so as to produce a signal pressure reflective both of a selected vehicle speed and variations in the actual vehicle speed from the selected speed indicated by the governor pressure for causing the pressure actuated means to urge the throttle in an opposite direction, means for causing the pressure developing valve means to cause pressure from the source to be supplied to the pressure actuated means when a governor pressure corresponding to the selected vehicle speed is developed, the signal pressure and the pressure from the source together acting on the pressure actuated means so as to alter throttle settings and thereby cause vehicle speed to correspond to the selected vehicle speed.

9. In a speed control system for a throttle controlled vehicle having a transmission that includes a pressure source and a device for producing governor pressure that varies directly with vehicle speed, the combination of fluid actuated means for operating the throttle, supply means operative to connect the source to the pressure actuated means so as to urge the throttle in one direction, and pressure developing valve means effective to produce from source pressure and in accordance with the governor pressure a signal pressure that is reflective both of a selected vehicle speed and variations in the actual vehicle speed from the selected vehicle speed indicated by the governor pressure, means for causing the pressure developing valve means to render the supply means operative when a governor pressure corresponding to the selected vehicle speed is developed, the signal pressure and the pressure from the source together causing the pressure actuated means to alter throttle settings so that vehicle speed is caused to correspond to the selected vehicle speed.

10. In a speed control system for a throttle controlled vehicle having a transmission that includes a pressure source and a device for producing a governor pressure that varies directly with vehicle speed, the combination of fluid pressure actuated means for operating the throttle, a manual control for selecting a desired vehicle speed, governor valve means operated by both the governor pressure and the manual control so as to develop a signal pressure that reflects both the desired vehicle speed selected by the manual control and variations in actual vehicle speed from the desired vehicle speed indicated by the governor pressure, a supply valve operative to connect the source pressure to the pressure actuated means, and means operated by the governor valve means when a governor pressure corresponding to the selected desired speed is developed so as to render the supply valve effective, the signal pressure and the source pressure together causing the pressure actuated means to alter throttle settings so that actual vehicle speed is caused to correspond to the selected desired speed.

11. In a speed control system for an engine, the combination of an engine speed controller, a fluid pressure operated motor for actuating the speed controller, supply means operative to provide a reference fluid pressure, the reference pressure acting directly on the motor to cause the speed controller to be urged in one direction, and valve means developing a signal fluid pressure reflective both of a selected speed and variations in engine speed from the selected speed, the signal pressure also acting directly on the motor to cause the speed controller to be urged in an opposite direction, means for causing the signal pressure developing means to render the supply means operative to provide the reference pressure to the motor when a certain signal pressure is supplied to the motor, the signal and reference pressures causing the motor to alter the engine speed controller setting so that the engine speed corresponds to the selected speed.

12. In a speed controlling system for an engine, the combination of an engine speed controller, a fluid pressure operated motor for actuating the speed controller, a source of relatively constant pressure, a governor effective to develop a fluid pressure that varies with engine speed, a manual control maneuverable for selecting an engine speed, governor valve means arranged to be acted upon directly by both the governor pressure and the manual control so as to develop from source pressure a signal pressure reflective both of the speed selected by the manual control and variations in the engine speed from the selected speed determined by the governor pressure, the signal pressure being delivered from the governor valve means to the motor and acting directly thereon so as to cause the speed controller to be urged in one direction, a supply valve operative to connect the source to the motor, the source pressure also acting directly on the motor so as to cause the speed controller to be urged in an opposite direction, and means controlled by the governor valve means for rendering the supply valve operative to provide the motor with the source pressure when a governor pressure corresponding to the selected speed is developed, the signal pressure and the source pressure together causing the motor to actuate the speed controller and thereby alter the speed control settings so that engine speed corresponds to the selected speed.

13. In a speed control system for a throttle controlled vehicle having a transmission that includes a fluid pressure source and a device for producing a governor fluid pressure that varies with vehicle speed, the combination of a fluid pressure operated motor for actuating the throttle, a manual control for selecting a desired vehicle speed, governor valve means arranged to be acted on directly by both the governor pressure and the manual control so as to develop a signal pressure that reflects both a desired vehicle speed selected by the manual control and the variations in actual vehicle speed from the desired vehicle speed determined by the governor pressure, a supply valve operative to connect the source pressure to the motor so as to act directly thereon, and means operated by the governor valve means when a governor pressure corresponding to the selected desired speed is developed so as to render the supply valve effective to provide the motor with the source pressure, the signal pressure and the source pressure together causing the servo motor to alter throttle settings to that the actual speed is caused to correspond to the selected desired speed.

References Cited in the file of this patent

UNITED STATES PATENTS

| | | |
|---|---|---|
| 2,324,191 | Bowers | July 13, 1943 |
| 2,527,353 | Christian | Oct. 24, 1950 |
| 2,765,800 | Drake | Oct. 9, 1956 |
| 2,972,391 | Faiver et al. | Feb. 21, 1961 |
| 2,976,946 | Denman et al. | Mar. 28, 1961 |